United States Patent [19]

Spicer

[11] Patent Number: 5,160,078
[45] Date of Patent: Nov. 3, 1992

[54] ROTATING COMPLIANT TAPE GUIDE

[75] Inventor: Barry K. Spicer, Berthoud, Colo.

[73] Assignee: Storage Technology Corporation, Louisville, Colo.

[21] Appl. No.: 654,222

[22] Filed: Feb. 12, 1991

[51] Int. Cl.⁵ .......................................... B65H 27/00
[52] U.S. Cl. ....................................... 226/190; 242/76
[58] Field of Search .................. 226/190, 196; 242/76

[56] References Cited

U.S. PATENT DOCUMENTS

| | | | |
|---|---|---|---|
| 3,143,270 | 8/1964 | Cohen | 242/76 X |
| 3,276,651 | 10/1966 | Bryer | 226/190 |
| 3,768,717 | 10/1973 | Salcedo | 242/76 X |
| 4,091,179 | 5/1978 | Browder | 242/76 X |
| 4,336,900 | 6/1982 | Pontoni | 242/76 X |
| 4,441,133 | 4/1984 | Ogawa et al. | 226/190 X |
| 4,573,619 | 3/1986 | Grant | 226/190 |

FOREIGN PATENT DOCUMENTS

| | | | |
|---|---|---|---|
| 0454584 | 2/1975 | U.S.S.R. | 242/76 |
| 0553670 | 4/1977 | U.S.S.R. | 242/76 |
| 0652610 | 3/1979 | U.S.S.R. | 226/190 |

OTHER PUBLICATIONS

IBM Technical Diclosure Bulletin, "Compliant Guide Assembly", vol. 29, No. 5; Garcia et al.; Oct., 1986.

IBM Technical Disclosure Bulletin, "Continuous Compliant Tape Guide", vol. 15, No. 8; Griffiths; Jan. 1973.
IBM Technical Disclosure Bulletin "Tape Guide Design"; vol. 27, No. 7B, Andresen et al., Dec., 1984.

*Primary Examiner*—Daniel P. Stodola
*Assistant Examiner*—P. Bowen
*Attorney, Agent, or Firm*—Dorr, Carson, Sloan & Peterson

[57] ABSTRACT

A tape guide which includes a roller having a fixed lower flange and a tape contacting portion having a width less than the width of the tape. A compliant member formed from a flat spring is mounted on the top of the roller opposite the flange. The compliant member includes an outwardly and upwardly tapered peripheral portion extending beyond the diameter of the tape contacting portion of the roller. Since the tape width is greater than the width of the tape contacting portion of the roller, the tape is forced against the tapered portion of the compliant member. The compliant member thus biases the tape downward against the lower flange by applying a uniform distributed load against the upper edge of the tape. The tape is prevented from being vertically displaced regardless of variations in the width of the tape. Variations in the wrap angle will not affect the loading on the tape.

14 Claims, 2 Drawing Sheets

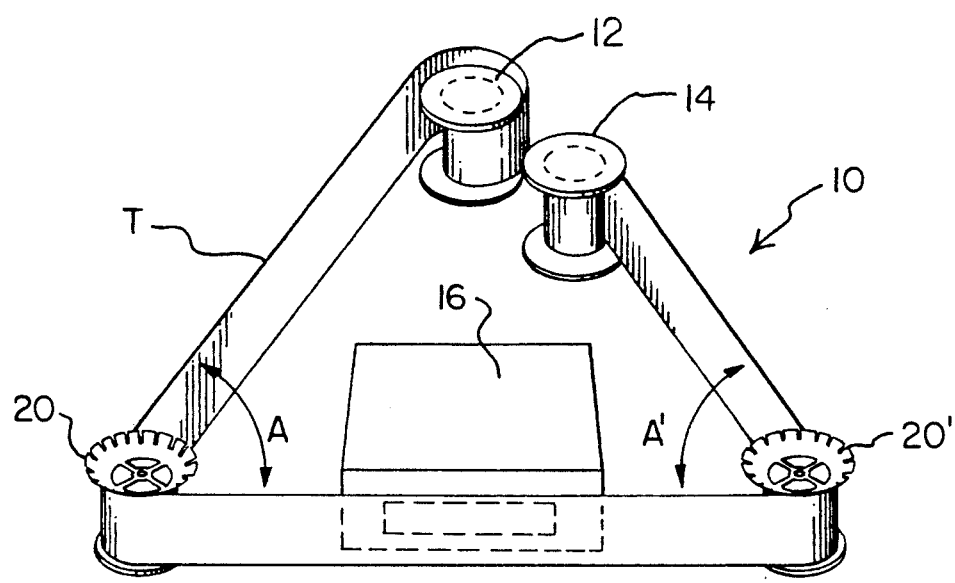
FIG. 1.
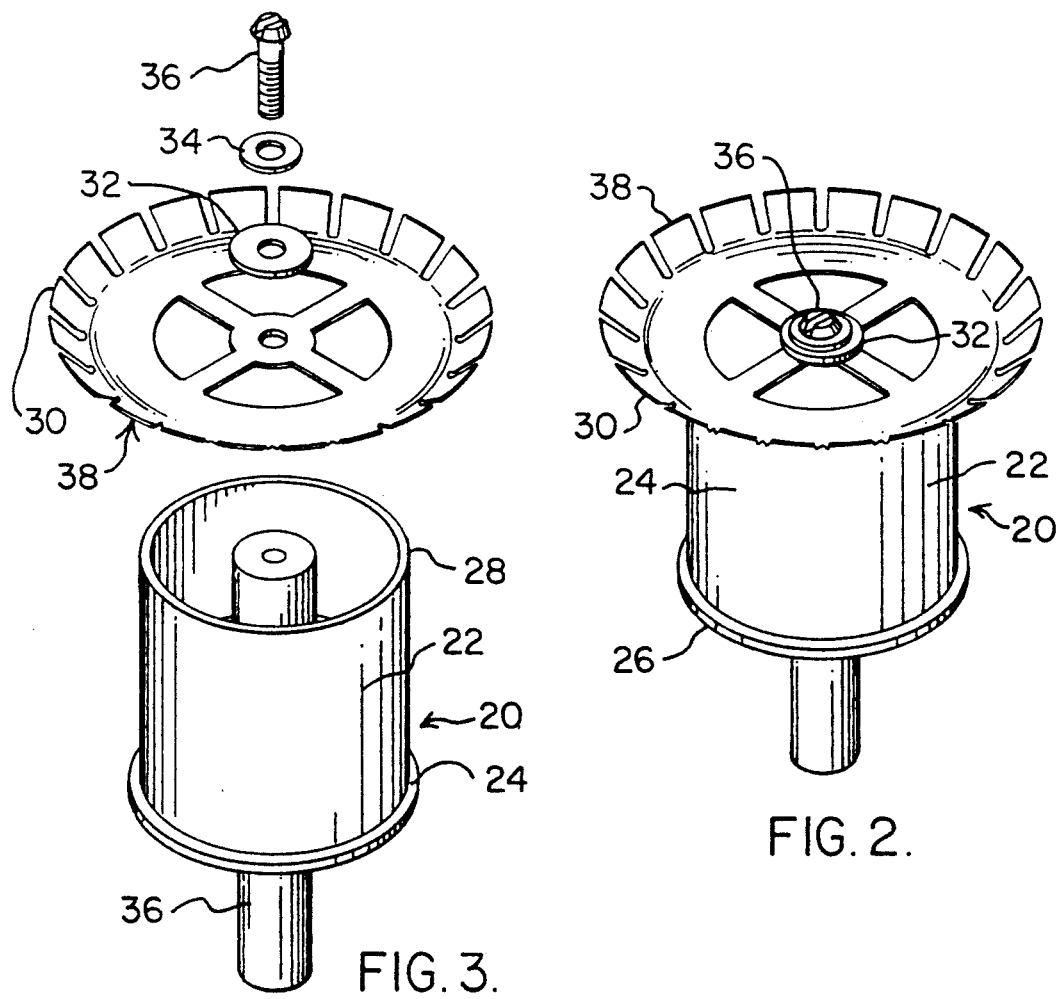
FIG. 2.
FIG. 3.

ROTATING COMPLIANT TAPE GUIDE

BACKGROUND OF THE INVENTION

1. Field of the Invention

This invention relates to the field of tape guides for a magnetic tape drive system.

2. Background of the Problem

Tape drive systems for reading information from or writing information on magnetic tapes require tape guides to ensure that the tape is positioned correctly relative to the magnetic tape head. The tape must be driven past the tape head(s) in precise position so that the appropriate tracks of the tape are positioned relative to the heads.

One type of prior tape guide uses rollers having integral non-compliant fixed upper and lower flanges to guide the tape. Problems arising from this type of tape guide include friction generated from the tape movement against the fixed flanges which results in tape speed variations, tape resonance excitation, and tape debris generation. Also, the tape frequently varies in width, so that the flanges must be separated in excess of the tape width which results in vertical tape movement. The vertical displacement of the tape causes poor tracking of the tape as well as buckling and creasing of the tape as the tape encounters the roller.

Another type of prior tape guide uses cylindrically shaped air bearings having fixed, nonrotating lower flanges and fixed upper compliant members. The upper compliant members force the tape against the lower flange and the air bearings provide support to guide the tape into position. However, as the diameter of the tape being unwound or wound on the reels changes as the tape is wound or unwound, the "wrap angle", that is the angle formed between the tape and the tape guide, varies. The wrap angle variations result in exposure of the air bearing supply holes which cause an imbalance to the pneumatic system creating tape oscillations due to the impingement of the air. The air bearings also add considerably to the cost and mass of the drive as well as requiring an air supply to generate the air pressure for the bearings.

A need therefore exists for a tape guide which will guide the tape without regard to the wrap angle variations, which will provide a uniform distributed load on the tape to prevent vertical displacement of the tape and will reduce the mass and expense of the tape drive system.

SOLUTION

The present invention provides a solution to these and other problems. The present invention provides a substantially frictionless tape guide for precisely positioning the tape.

The present invention provides a tape guide that provides a uniform distributed load on the tape to prevent vertical tape displacement.

The present invention provides a tape guide which is not affected by variations in tape width.

The present invention provides a tape guide which is not affected by wrap angle variations.

These and other features of the invention will be set forth by the following description of one possible preferred exemplary embodiment taken in conjunction with the drawings.

SUMMARY OF THE INVENTION

The present invention provides a tape guide which includes a roller having a fixed lower flange. The roller has a tape contacting portion having a width less than the width of the tape. A compliant member formed form a flat spring is mounted on the top of the roller. The compliant member includes an upwardly tapered peripheral portion extending beyond the periphery of the tape contacting portion of the roller. Since the tape width is greater than the width of the tape contacting portion of the roller, the tape is forced against the tapered portion of the compliant member. The compliant member thus biases the tape downward by applying a uniform distributed load against the upper edge of the tape. This load forces the lower edge of the tape against the lower flange of the roller. The tape is prevented from being vertically displaced regardless of variations in the width of the tape. Variations in the wrap angle will not affect the loading on the tape.

These and other features will be evident from the following description of a preferred embodiment taken in conjunction with the drawings.

BRIEF DESCRIPTION OF THE DRAWINGS

FIG. 1 is a perspective view of a tape drive using one possible preferred exemplary embodiment of the tape guide of the present invention.

FIG. 2 is a perspective view of a tape guide of FIG. 1.

FIG. 3 is an exploded view of the tape guide of FIG. 2.

DETAILED DESCRIPTION OF A PREFERRED EMBODIMENT

Figure 4:
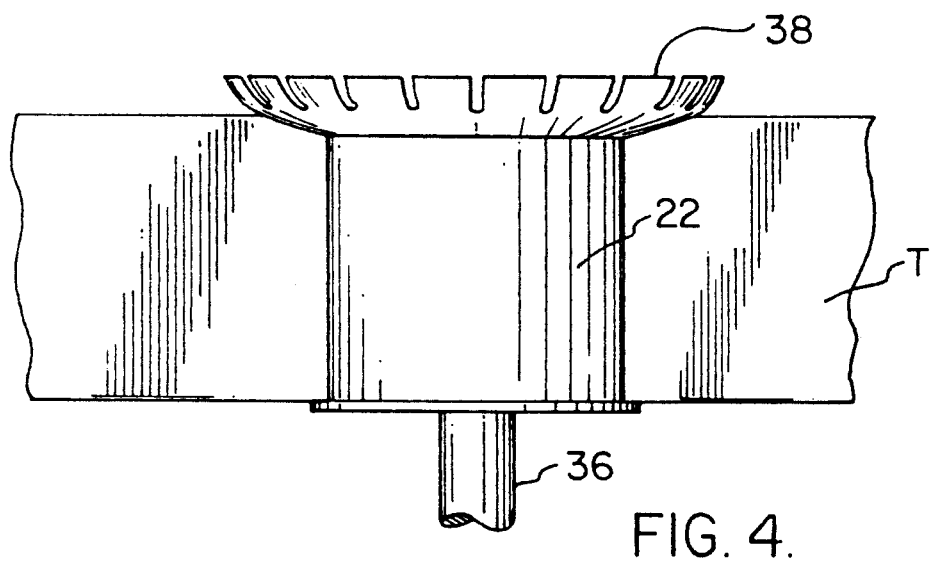
FIG. 4 is a side view of a tape being guided by the tape guide of FIG. 2 and 3.

The present invention provides a tape guide for guiding tape into precise position within a tape drive system. The tape guide of the present invention guides the tape with little friction buildup, and is not affected by tape width variations or wrap angle variations.

Illustrated in FIG. 1 is one possible exemplary preferred embodiment of the present invention. The tape device 10 includes a supply reel 12 on which the tape T is initially wound, a first tape guide 20, a magnetic read/write head 16, a second tape guide 20', and a take up reel 14. Tape T is supplied by supply reel 12 and is positioned relative to magnetic head 16 by tape guides 20, 20' so that information can be read from tape T or recorded onto tape T by magnetic head 16.

The description of this embodiment of the present invention is for explanatory purposes only and is not meant to limit the claimed invention. Other variations or embodiments are contemplated as being within the scope of the claimed invention. For instance, the present invention is considered to have particular utility with a standard IBM 3480 style tape cartridges in computer tape drive systems.

In FIG. 1, tape T is wound around supply reel 12 and threaded around tape guides 20, 20' to take up reel 14. Typically the tape width varies slightly. In the present invention, tape T is uniformly positioned relative to one edge of the tape. The present invention positions tape T by applying a constant uniform load on the upper edge of tape T so that the lower edge of tape T is firmly positioned against the lower edge of tape guide 20 as described below.

Also, as the diameter of tape T wound on supply reel 12 and take up reel 14 is reduced or increased, the wrap angle varies. The wrap angle is the angle A, A', as shown in FIG. 1, at which the tape T approaches tape guides 20, 20'. The present invention provides a uniform load on the tape that is not affected by variations in the wrap angles A, A'. The present invention also provide substantially frictionless support for tape T which is not affected by variations in wrap angle A, A'. Therefore variations in tape width or wrap angles will not affect the performance of the tape drive 10 using the tape guides 20, 20' of the present invention.

Tape guide 20 is described in more specific detail in FIGS. 2-4. Tape guide 20' is identical in structure and performance as tape guide 20. Tape guide 20 includes a cylindrically-shaped roller 22 mounted to freely rotate at appropriate locations on tape drive 10. Roller 20 includes tape contacting region 24 and lower flange portion 26. Lower flange portion 26 has a larger diameter than the diameter of tape contacting region 24.

Compliant member 30 is attached to the top of roller 22 by screw 36 and washers 32, 34 to rotate with roller 22. Compliant member 30, in this exemplary description, is formed from a flat spring. Compliant member 30 includes spring portions 38 tapered upward from the outer periphery of tape contacting region 24 of roller 22.

Tape transfer region 24 of roller 22 has a width less than the width of tape T as shown in FIG. 4. Since the width of tape contacting region 24 is less than the width of tape T, tape T will press upward against spring portions 38 of compliant member 30. The spring portions 38 will thus exert a uniform distributed load on the upper edge of tape T regardless of variations in tape width. The lower edge of tape T will be forced against lower flange 26 by the uniform distributed load on the upper edge of tape T. Vertical displacement of tape T will be prevented, thus improving the tracking capability of tape T.

The uniform distributed load on the upper edge of tape T from compliant member 30 is not affected by variations of wrap angle A. Compliant member 30 has a circular design which extends sufficiently beyond the outer periphery of roller 22 so that uniform loading occurs over variations in wrap angle of tape T. Also, the circular design and free rotation of roller 20 provide substantially frictionless support for tape T which is not affected by variations of wrap angle A.

The present invention provides a simple, effective tape guide which will accurately position tape relative to a magnetic tape head or other structure. The tape guide of the present invention is not affected by variations in tape width nor will changes in wrap angle of the tape detract from the performance of the tape drive. The present invention does not increase the mass of the system and is relatively inexpensive to manufacture and install.

This description is not meant to limit the claimed invention. Other variations are considered to be within the scope of the inventive concept. For example, the compliant member can be formed in various shapes and form different materials. The compliant member can also have only its upwardly tapered portions be resilient to apply the uniform distributed load on the tape. A plurality of tape guides of the present invention can be utilized in various combinations and applications as necessary to position the tape in a tape drive.

It is to be expressly understood that the claimed invention is not to be limited to the description of the preferred embodiment but encompasses other modifications and alterations within the scope and spirit of the inventive concept.

I claim:

1. A tape guide for positioning tape within a tape drive system, said tape guide comprising:
    an elongated roller mounted to rotate within said tape drive system, said roller having a first end and an opposing second end;
    a tape contacting portion formed on said roller between said first end and said second end, said tape contacting portion having a width less than the width of the tape being guided by said tape guide;
    a flange on said roller adjacent the second end of said roller, said flange having a diameter larger than the diameter of said tape contacting portion; and
    compliant means affixed to said first end of said roller to rotate with said roller for providing a uniform resilient force against one edge of the tape to bias the other edge of the tape against said flange.

2. The tape guide of claim 1 wherein said compliant means is a spring.

3. The tape guide of claim 2 wherein said spring includes an outer edge portion tapered upward and outward from the periphery of said roller.

4. The tape guide of claim 1 wherein said compliant means includes a resilient portion extending beyond the outer periphery of said roller to provide said resilient force.

5. The tape guide of claim 4 wherein said resilient portion extends upward at an angle to said outer periphery of said roller.

6. A tape guide for a tape drive system to position magnetic tape adjacent a read/write head, said tape guide comprising:
    an elongated cylindrically shaped roller mounted for rotation on said tape drive system, said rotatable roller having a first end and a second end,
    said rotatable roller including a tape contacting portion between said first end and said second end and a flange located adjacent said second end of said roller, having a diameter larger than the diameter of said tape contacting portion; and
    means affixed to and rotating with said rotatable roller for providing a uniform distributed load on one edge of said tape that is non-variant with change in the wrap angle of said tape to force the second edge of said tape against said flange.

7. The tape guide of claim 6 wherein said tape contacting portion has a length less than the width of said tape, said providing means comprises:
    a compliant member attached to said first end of said rotatable roller and having a diameter larger than the diameter of said elongated portion of said rotatable roller so that said compliant member applies a resilient force against said one edge of said tape.

8. The tape guide of claim 7 wherein said compliant member is a spring attached to said first end of said roller.

9. The tape guide of claim 8 wherein said spring includes an outer edge portion tapered upward at the periphery of said roller.

10. The tape guide of claim 7 wherein said compliant member includes a resilient portion extending beyond the outer periphery of said roller to provide said resilient force.

11. The tape guide of claim 10 wherein said resilient portion extends upward at an angle to said outer periphery of said roller.

12. A tape guide for positioning tape in a tape drive system, said tape guide comprises:
- a cylindrically shaped roller mounted to rotate on said tape drive system, said roller having a first end and an opposing second end;
- a tape contacting portion formed on said roller between said first end and said second end having a width less than the width of the tape;
- a flange formed adjacent said second end of said roller, having a diameter greater than the diameter of said tape contacting portion; and
- a compliant member attached to said first end of said roller and rotatable with said roller, having a diameter larger than the diameter of said tape contacting portion, so that said compliant member applies a resilient force against one of the edges of said tape to force the opposing other edge of said tape against said flange.

13. The tape guide of claim 12 wherein said compliant member is a spring.

14. The tape guide of claim 13 wherein said spring includes an outer edge portion tapered upward from the periphery of said roller.

* * * * *